June 23, 1970  C. P. BEAN  3,517,203
OPTICAL APPARATUS AND METHOD FOR DETERMINATION OF PORE
DIMENSIONS IN SHEET MATERIAL
Filed July 26, 1968  3 Sheets-Sheet 1

INVENTOR:
CHARLES P. BEAN,
by Paul A. Frank
HIS ATTORNEY

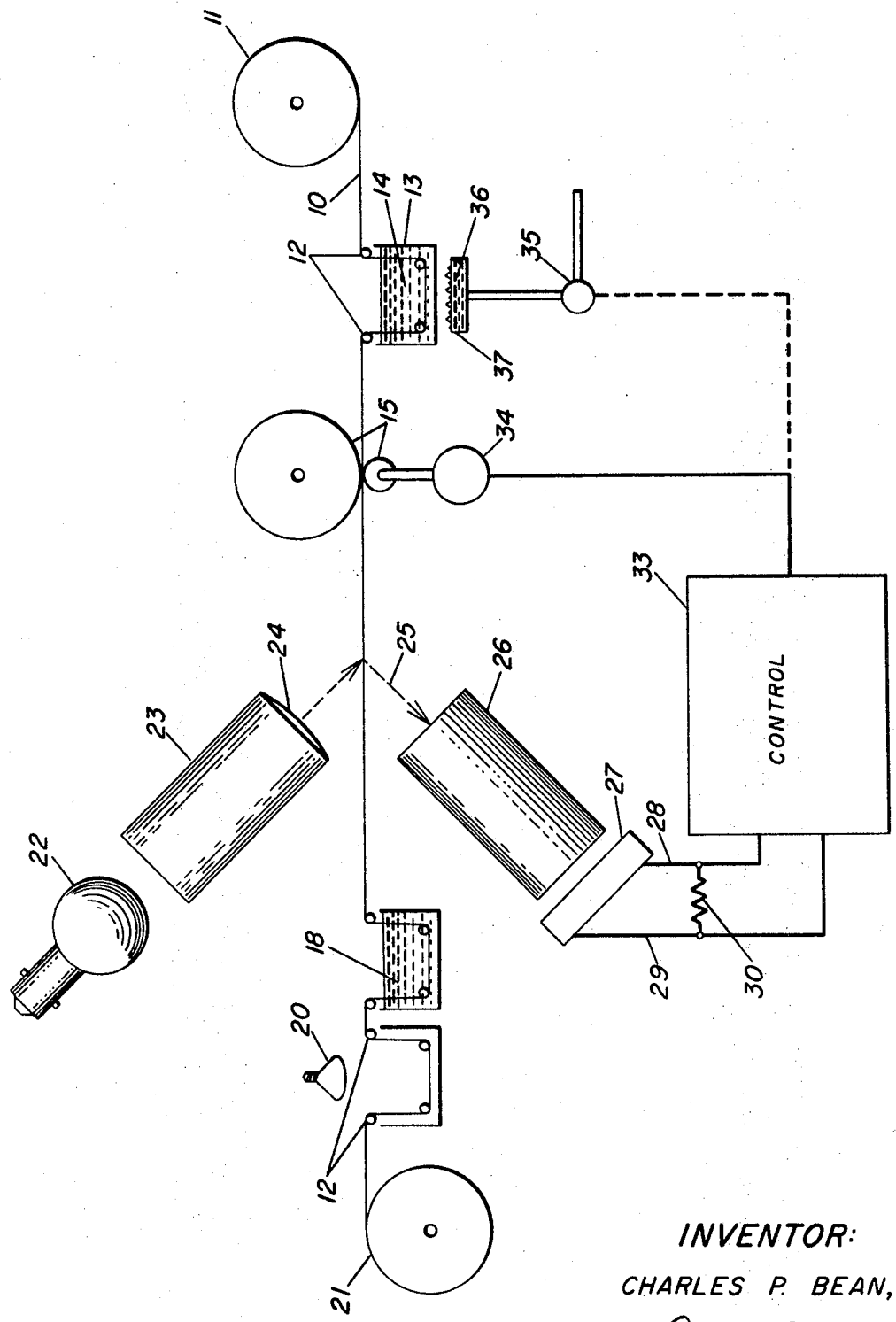

June 23, 1970   C. P. BEAN   3,517,203
OPTICAL APPARATUS AND METHOD FOR DETERMINATION OF PORE
DIMENSIONS IN SHEET MATERIAL
Filed July 26, 1968   3 Sheets-Sheet 3
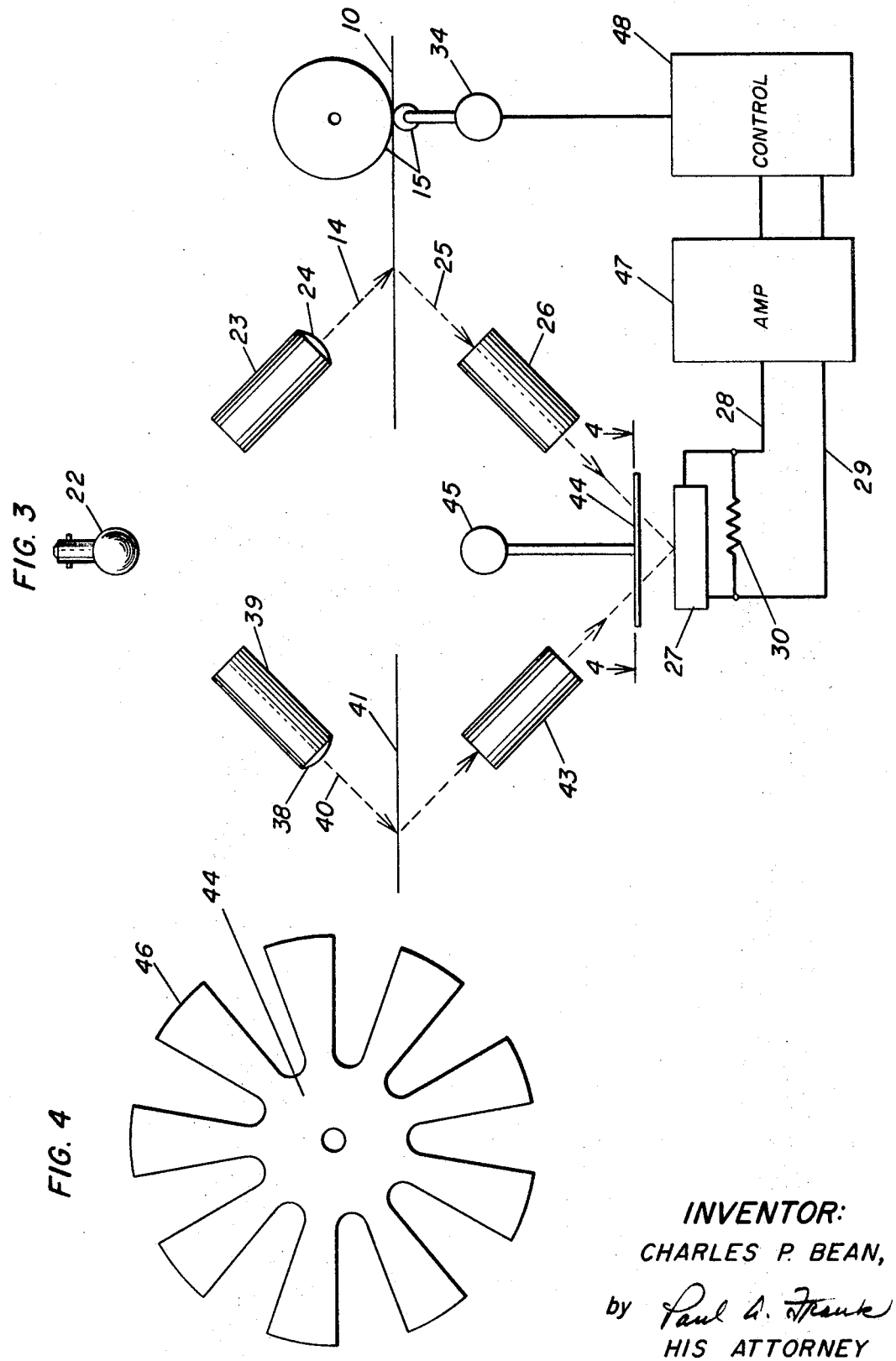
INVENTOR:
CHARLES P. BEAN,
by Paul A. Frank
HIS ATTORNEY

United States Patent Office 3,517,203
Patented June 23, 1970

3,517,203
OPTICAL APPARATUS AND METHOD FOR DE-TERMINATION OF PORE DIMENSIONS IN SHEET MATERIAL
Charles P. Bean, Schenectady, N.Y., assignor to General Electric Company, a corporation of New York
Filed July 26, 1968, Ser. No. 748,080
Int. Cl. G01n 15/08, 21/32
U.S. Cl. 250—219                                14 Claims

ABSTRACT OF THE DISCLOSURE

Optical apparatus which utilizes the light scattering characteristics of porous, light transmissive sheet-like material to measure pore dimensions is disclosed. Scattered light emerging from the sheet along a predetermined path falls on the surface of a voltaic cell which generates a current substantially linear to the incident flux. The generated signal, being proportional to the dimensions of the pores in the material, is utilized to measure pore size. The employment of the generated current to control the size of the pores through direct or differential control of variables in a pore-forming apparatus is also described.

---

My invention relates to optical apparatus and method for determining pore size in porous materials, and more particularly to optical apparatus and method for utilizing the light scattering characteristics of light transmissive porous material to measure or control the dimensions of pores therein.

Due to the increase in cytological research and in allied fields, a large demand has been raised for and met by the advent of small pore light transmissive filters for microanalysis and microfiltration. The filters are usually available commercially in tape or sheet form. Quality control ordinarily consists of examining sample portions of the sheet through a microscope and measuring the pores therein. This is a tedious, expensive, time consuming process which has not proven to be an entirely satisfactory method of insuring proper pore size.

The present optical apparatus used for monitoring parameters of thin sheet-like material have similarly proven to be unsatisfactory for examination of light transmissive, porous sheet material. Primarily, the typical present optical apparatus utilize the electromagnetic radiation absorption characteristics of a sample of material to measure dimensions, such as thickness, necessitating limitation of the various wavelengths of impinging light to a narrow band centering around the material absorption wavelength. To do this requires filters and usualy a reflecting surface positioned adjacent the material on the opposite light source and measuring apparatus. The absorption of light in a material substantially transparent is usually small. Thus, the absorption difference when the parameters of the material change is also small and not sufficient for measurements requiring high degree of sensitivity. This is particularly true when examining light transmissive porous sheet materials for pore size. Porous sheet material as used through the present application is defined as a thin sheet of a material which has pores extending transversely from one major surface to the other major surface.

Apparatus of the present invention does not require either a filter or a continuous reflecting surface. Instead, the apparatus utilizes the light scattered by the light transmissive porous sheet to measure or otherwise control the size of the pores. I have found that apparatus in accord with my invention gives measurements of pore size to a higher degree of accuracy than any apparatus now present in the art.

Accordingly, it is an object of the present invention to provide for optical apparatus and method which determine pore size in porous light transmissive sheet material with a high degree of accuracy.

It is another object of the present invention to provide for optical apparatus and method which control the pore size in porous light transmissive sheet material by utilizing the light scattering characteristics of the apertured material.

Throughout the present application the terms "light" and "light flux" are employed. Broadly, light is defined as that portion of the electromagnetic radiation spectrum extending from the region of ultraviolet to the region of infrared wavelengths. The radiation utilized by apparatus in this application is confined for descriptive purposes to light visible to the human eye. It is understood, however, that the apparatus of my present invention may employ forms of electromagnetic radiation beyond sensing capabilities of the human eye, when desired, accordingly, for purposes of description light flux is defined simply as the energy of light producing a visual stimulation.

Briefly, the apparatus of one embodiment of my present invention detects the scattered light flux by using an angularly disposed light responsive means, for example, a voltaic cell which generates a voltage upon light impingement. A small electric current is obtained from the voltage and made substantially linear to the impinging light flux and, in one feature of the present invention, fed to a means for visually indicating the magnitude of the signal. Since the signal is linearly related to the scattered light flux, which in turn depends upon pore size, the indicating means is in fact exhibiting visually pore size. By calibration in proper units of dimensions, the indicating means is made to read directly in pore size units, for example, microns.

In another feature of this embodiment, the current output is fed directly to a control means which in response to the current output controls, or otherwise varies conditions upon which pore size depends.

In another embodiment of this invention, the signal output resulting from light scattering through a standard or control sheet containing pores of known size is compared to the output signal of the sample. The signal differential resulting from the comparison is used in a manner similar to the direct signal to vary pore size of the sample until the signal differential approaches zero.

The novel features believed characteristic of the present invention are set forth in the appended claims. The invention with further objects and advantages thereof may be best understood by reference to the following description taken in connection with the accompanying drawings in which:

FIG. 2 is a similar view of the embodiment in FIG. 1 wherein signal output is used to control pore size;

FIG. 3 is a schematic diagram showing another embodiment of my apparatus construed in accordance with the present invention wherein signal output is compared with a signal output of a standard; and FIG. 4 is a front view along line 4—4 of FIG. 3 showing an embodiment of a rotating light chopper employed in accordance with FIG. 3.

Figure 1:
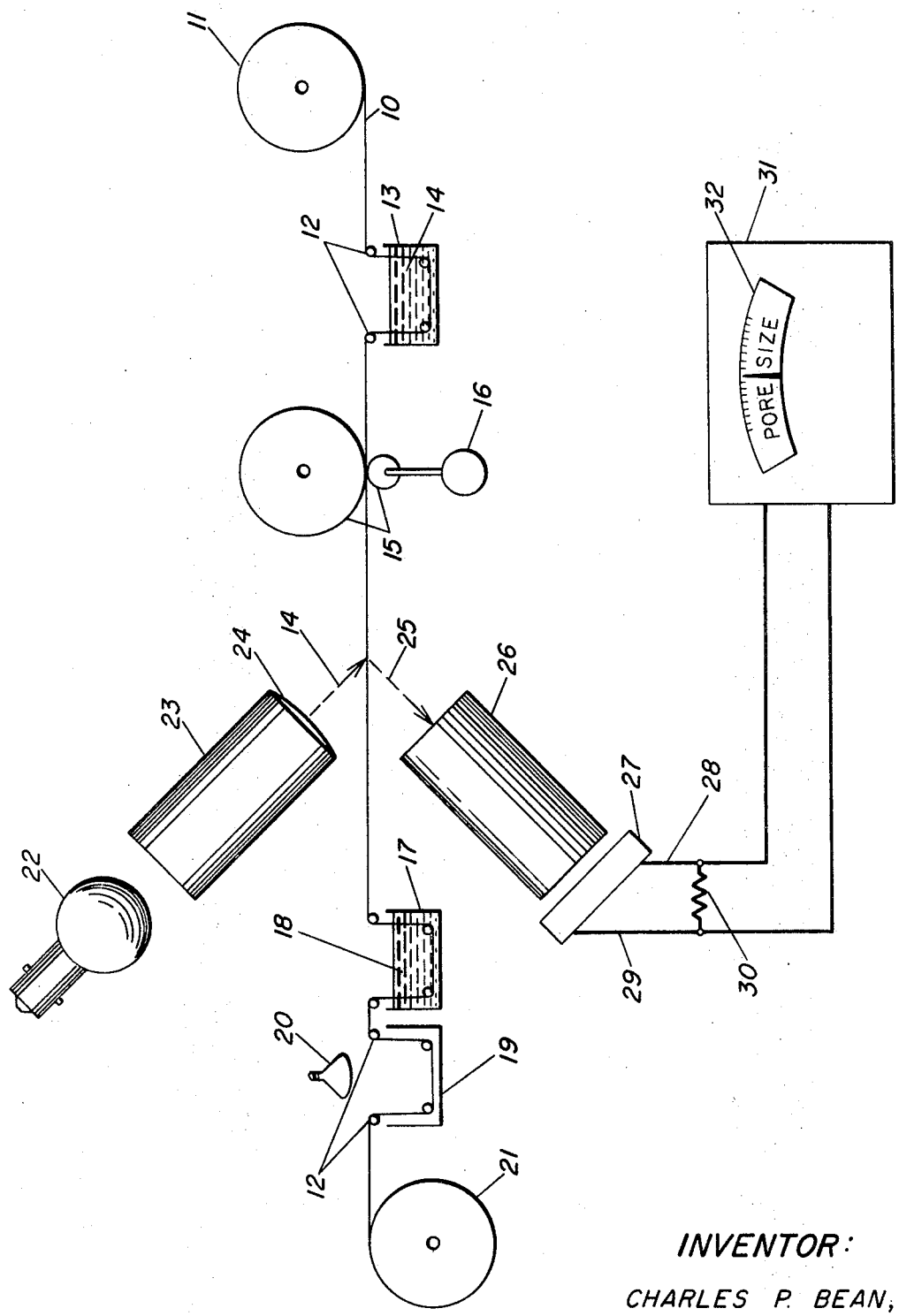
FIG. 1 is a schematic diagram showing an embodiment of apparatus construed in accordance with the present invention wherein the signal output is read directly as pore size.

When light passes through a light transmissive material there is a deviation of a portion of the light from the normal refracting path. The deviated or scattered light is ordinarily small in magnitude when compared to the refracted or directly transmitted light. By making the light transmissive material porous, I have found that the amount of light scattered along a given path increases in intensity. Further, by maintaining the number of pores per unit area constant in the porous material, I have found that the scattered light through the porous material sample increases as the size of the pores increases. The measure of the change in light flux is accomplished by focusing the scattered light along an angle, for example, 90° to the incident path to a photosensitive means such as a voltaic cell. The photosensitive means generates a voltage in response to the light flux impinging on its surface. The signal varies proportionally but not linearly to change in light flux. By proper utilization of a shunting, resistor, a small current substantially linear to the light flux is generated. The current or signal output is utilized to attain the necessary quality control objectives set forth in a manner best explained in conjunction with the figures and description.

I also have found that the intensity of light flux scattered along a scattering path increases toward a maximum value as the angle between the incident path and the scattering path approaches 90°. As the scattering angle is increased above 120°, the intensity of the scattered light diminishes more rapidly while much smaller angles may allow light to enter the detector directly, depending on design. Therefore, while a scattering angle of 90° is preferred, other scattering angles, particularly those between 20° and 120° may be employed.

An optical apparatus of my present invention may be directly utilized in the manufacture of porous sheet material, an example of which is illustrated in FIG. 1. Sheet 10, which may comprise polycarbonate plastic for purpose of the example, has been irradiated with high energy particles. The structure of the material in the path of the particles is weakened. Sheet 10 mounted on supply reel 11 through the action of drive wheels 15 driven by motor 16 moves around guide rollers 12 into container 13 holding "etching" solution 14. Through immersion in etching solution 14, the weakened material is preferentially removed thus forming pores, the number of which depends proportionally upon the number of particle paths created per unit area in sheet 10. For descriptive purposes in this application, the number of pores per unit area are considered to be constant. Such a number may be, for example, on the order of $1 \times 10^7$ pores per cm.$^2$. The process of removing the material is called "etching." Etching solution 14, for example, may be a particular concentration of sodium hydroxide.

There are a number of variables upon which pore size depends in the example manufacturing apparatus. The most prominent ones are etching solution concentration, etching solution temperature, and the rate of sheet movement through the etching solution. These variables are of considerable interest and will be discussed in that context later in the application. The variation of pore size, however, is defined herein as the difference in average size of pores situated in large areas of sheet material 10.

After immersion, sheet 10 moves transversely across optical path 14 and is guided into container 17 holding a rinsing solution 18, which removes any adhering etching solution 14 from sheet 10. Chamber 19 contains a heat source 20 which dries sheet 10 before it is collected by take-up reel 21.

Light source 22 emits light which is collected and focused by lens 24 along optical path 14 impinging on the surface of transversely moving sheet 10. The portion of sheet 10 intersecting optical path 14 is tautly maintained so as to form a substantially planar surface. This may be accomplished in the example of FIG. 1 by increasing the tension of sheet 10 between takeup reel 21 and drive wheels 15. A light shield 23 may be conveniently employed to prevent extraneous light from interfering with the proper operation of the apparatus. Shield 23 typically is made into tubular form, black in color, encompassing the optical path. Another light shield 26 may be used to collect light scattered along path 25. The scattered light then impinges on the surface of a light sensitive means such as voltaic cell 27 closely adjacent the opposite end of light shield 26. As illustrated, light shield 26 is conveniently arranged to gather light scattered at a 90° path to the incident light travelling along optical path 24. It is understood, however, that any scattering path sufficient for the herein described operation of optical apparatus of my present invention suffices as completely adequate.

Light impinging on the surface of voltaic cell 27 generates a voltage which is not linearly proportional to the incident light flux. The short circuit current, however, is proportional to light flux. Thus, by placing a shunting resistor across voltaic cell 27 (as for example, shown in FIG. 1 as resistor 30 across connecting wires 28 and 29) the resulting small current is substantially linear to light flux. Since the current is linearly proportional to the light flux impinging upon the surface of voltaic cell 27 which in turn is proportional to the size of the pores in sheet 10, the current is proportional to pore size.

The embodiment as shown in FIG. 1 illustrates the current output being utilized by an indicating means 31, calibrated to read pore size. Indicating means 31 may be, for example, an ammeter or electrometer. Typically, the calibration may be accomplished by running a series of sheets 10 containing pores of known size through the optical scattering apparatus and measuring the magnitude of the resulting current. By substituting pore size for the respective current magnitude readable on dial 32 of indicating means 31, direct reading is obtained.

I have found that it is possible to discriminate to at least a tenth of a micron when utilizing optical scattering in this manner. I have also found that the optical apparatus is relatively insensitive to variations in the thickness of sheet material. For example, using a sample with twice the desired thickness and containing pores of 0.96 micron, I have found that scattering increases only about 15 percent. Further, I have found that scattering increases proportionally when the sheet material is dry as opposed to wet. Thus, the positioning of the optical apparatus in a system as illustrated in FIG. 1 is not limited to a particular location. For example, the optical apparatus may be employed in drying chamber 19 as well with no resulting loss in sensitivity.

FIG. 2 illustrates another figure of the embodiment shown in FIG. 1 wherein current output is utilized directly to control the speed at which sheet 10 moves through solution 14 or to control the temperature at which the pores are formed in the sheet. For brevity, details of the apparatus shown in FIG. 1 are not shown in FIG. 2. As mentioned herein, the size of the pores depends on number of variables. When, for example, the temperature of etching solution 14 is too high, the size of the pores is increased beyond that desired. By increasing the rate of movement of sheet 10 through solution 14, the pore dimensions are decreased. Thus, by increasing the rate of sheet movement, the effect of increased temperature is compensated.

In FIG. 2, the current output goes directly to a control means 33 which controls the speed of variable speed motor 34. In the apparatus of FIG. 2 the rate of sheet movement is constant when the pores in sheet 10 are of proper dimensions. A change in pore size results in a corresponding change in current output. Control means 33, in direct response to the change in the current varies the speed of motor 16 driving drive wheels 15. Sheet 10 thus moves through etching solution 14 at a speed appropriate for obtaining pores of the desired dimensions.

On the other hand, it may be more expedient to control other variables, such as temperature. The generated current is employed by control means 33 to operate variable valve means 35 which maintains a proper flow of combustible fuel 36 into container 37. By increasing or decreasing the flow of fuel, the temperature of etching solution is varied, thus controlling the pore size.

Other apparatus for the manufacture of pores in sheet material may have variables of a different nature. Those skilled in the art in view of the method and apparatus disclosed can readily appreciate the advantages of utilizing optical apparatus of my present invention to control the appropriate variables in those such processes.

FIG. 3 is another embodiment of my present invention in which a standard sheet (or sheets) containing pores of desired dimensions is (or are) employed to control the size of the pores in the sheet being processed. Again certain details of the example apparatus as depicted in FIG. 1 are not displayed in FIG. 3.

Light source 22 emits light which is focused by a lens 38 along optical path 40, encompassed by a light shield 39 upon surface of standard sheet 41. The angle between optical path 40 and standard sheet 41 is shown to be equal to the angle between optical path 14 and sheet 10. This angle is used for illustrative purposes only and is not to be considered a specific limitation upon apparatus of the present invention.

The light is collected by light shield 43 or like means along scattering path 41. Positioned between light shield 26 and 40 is rotating light chopper 44 driven by motor 45. Light chopper 44 with teeth 46 is constructed in such a manner as to sequentially interrupt scattered light travelling along paths 14 and 40 to impinge on voltaic cell 27. An example of a typically constructed light chopper 44 is best seen in FIG. 4.

When the flux of the light scattered along paths 23 and 42 are equal then a steady, or D-C, current output is obtained. When one path passes greater light flux than the other, the current has a superimposed A-C component, of magnitude dependent on the differential scattering characteristics and with a frequency determined by a rotating speed of chopper 44 and size and shape of chopper teeth 46. The phase of the component depends upon whether sheet 10 or standard sheet 41 gives the greater amount of scattered light or flux.

Amplifier 47 amplifies a signal thus obtained and may, for example, be utilized by control means 48 for controlling the speed of motor 16. The change of speed of variable speed motor 34 accomplishes a change in size of the pores of sheet 10, as previously discussed.

From the foregoing, it is apparent that my invention attains the objects set forth. Thus, the light scattering characteristics of porous material as explained may be utilized to indicate or measure dimensions of the pores therein. The direct control of pore size in transparent sheet material is easily accomplished through my invention. A particular arrangement in geometry of the various optical elements in apparatus of my present invention is not limiting since it is evident that such depends on the process in which the apparatus is employed. It will be apparent to those skilled in the art, in view of this disclosure, that my invention is easily adaptable to other pore manufacturing processes. It is, therefore, to be understood that changes may be made in the particular embodiments of my invention which are within the full intended scope of the invention as defined by the following claims.

What I claim as new and desire to secure by Letters Patent of the United States is:

1. Apparatus for the determination of pore size in a thin continuous light transmissive porous sheet and comprising:
    means for providing a beam of light;
    means for transversely moving a thin continuous light transmissive porous sheet adjacent said light providing means;
    means for tautly maintaining a portion of said sheet causing a major surface of said portion to be substantially planar;
    first optical means for focusing said beam of light on said major surface along an optical path which defines a first predetermined angle with said major surface;
    second optical means for collecting light which has traversed said portion and which has been scattered by pores therein along a path which defines a second predetermined angle with said major surface;
    means receiving said scattered light flux from said collecting means for generating a signal in substantially linear response to said scattered light flux, said signal being in proportion to size of said pores in said portion of said sheet.

2. The apparatus of claim 1 wherein the sum of said first and second predetermined angles is 20° to 120°.

3. The apparatus of claim 1 wherein the sum of said first and second predetermined angles is approximately 90°.

4. Apparatus of claim 1 wherein said generating means comprises a voltaic cell and a shunting resistor and wherein said signal is an electric current.

5. Apparatus of claim 4 including means connected to said voltaic cell and shunting resistor for visually displaying the magnitude of said current.

6. Apparatus of claim 5 wherein said displaying means comprises calibrated means for visually indicating the magnitude of said generated signal in corresponding pore size dimensions.

7. Apparatus of claim 4 including control means responsive to said current for controlling operative variables in said apparatus upon which pore size depends.

8. Apparatus of claim 7 wherein said control means controls the rate of movement of said sheet through said apparatus.

9. Apparatus of claim 7 wherein said control means controls operating temperatures upon which pore size depends.

10. In an apparatus for the manufacture of light transmissive porous sheet material, an optical device for the inspection and control of pore dimensions in said sheet material, said optical device comprising a light source positioned adjacent one surface of transversely moving sheet of porous material;
    first optical means for focusing light of predetermined intensity on said sheet;
    second optical means for focusing light of said predetermined intensity on a standard containing pores of a standardized dimension;
    means for collecting light scattered by said sheet and standard along first and second respective preselected paths;
    voltaic cell means receiving incident scattered light and generating a current substantially linear to flux of said scattered light;
    means intermediate said collecting means and said voltaic means for sequentially interrupting passage of scattered light along said preselected paths and impressing an alternating current component upon said linear current when flux of light scattered along said first and second preselected paths is unequal.

11. Optical device of claim 10 including means for amplifying said alternating current.

12. Optical device of claim 11 including means responsive to said amplified alternating current for controlling variables in said apparatus which pore size depends.

13. A method for the inspection of pore dimensions in a light transmissive, thin, porous sheet comprising the steps of:
    continuously moving said porous sheet;
    focusing a beam of light along a first path which intersects a major surface of a section of said sheet;
    tautly maintaining said section of said sheet such that said major surface of said section defines a substantially planar surface and such that said major surface and said first path define a first predetermined angle;

collecting light scattered by said pores in said section of said sheet along a second path defining a second predetermined angle with said first path;

generating a signal varying linear to said scattered light along said second path; and measuring the magnitude of said signal varying linear to said scattered light.

14. A method for comparing of pore dimensions in a light transmissive, thin, porous sheet comprising the steps of:

continuously moving said porous sheet;

focusing a first beam of light of a predetermined flux density along a first path intersecting a section of said sheet;

focusing a second beam of light of said predetermined flux density along a second path intersecting a standard containing pores of a predetermined size;

collecting light scattered by pores in said section of said sheet in a first direction forming a first angle with said first path;

collecting light scattered by pores in said standard in a second direction forming a second angle with said second path;

sequentially generating signals varying linearly to said light scattered in said first and said second directions; and measuring the differences in the magnitudes of said signals varying linearly to said light scattered in said first and said second direction.

References Cited

UNITED STATES PATENTS

| | | | |
|---|---|---|---|
| 2,032,128 | 2/1936 | Horsfield | 356—199 X |
| 2,528,157 | 10/1950 | Menke | 250—219 X |
| 3,206,603 | 9/1965 | Mauro | 250—219 X |
| 3,388,259 | 6/1968 | Flower | 250—219 X |

WALTER STOLWEIN, Primary Examiner

U.S. Cl. X.R.

356—239